US010067035B2

(12) United States Patent
Bowler et al.

(10) Patent No.: US 10,067,035 B2
(45) Date of Patent: Sep. 4, 2018

(54) AUTO TESTING SYSTEM FOR A GAS TURBINE

(71) Applicant: Siemens Aktiengesellschaft, Munich (DE)

(72) Inventors: Samuel Bowler, Lincol (GB); Michael Smith, North Hykeham (GB); Andrew Yarwood, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 347 days.

(21) Appl. No.: 14/763,765

(22) PCT Filed: Jan. 22, 2014

(86) PCT No.: PCT/EP2014/051168
§ 371 (c)(1),
(2) Date: Jul. 27, 2015

(87) PCT Pub. No.: WO2014/122013
PCT Pub. Date: Aug. 14, 2014

(65) Prior Publication Data
US 2015/0362405 A1 Dec. 17, 2015

(30) Foreign Application Priority Data
Feb. 5, 2013 (EP) .................. 13154041

(51) Int. Cl.
G01M 15/00 (2006.01)
G01M 15/14 (2006.01)
(Continued)

(52) U.S. Cl.
CPC ............ G01M 15/14 (2013.01); F02C 3/04 (2013.01); F02C 9/26 (2013.01)

(58) Field of Classification Search
CPC .... G01M 15/14; G01M 15/044; G01M 15/02; G01L 3/24; F02C 3/04; F02C 9/26; F01D 21/003
See application file for complete search history.

(56) References Cited

U.S. PATENT DOCUMENTS 4,215,412 A * 7/1980 Bernier .................. G07C 3/00
701/100
4,389,710 A * 6/1983 Rasmussen ............ B60T 8/885
303/122.08

(Continued)

FOREIGN PATENT DOCUMENTS

CN 1408995 A 4/2003
CN 101726416 A 6/2010
(Continued)

OTHER PUBLICATIONS

CN Office Action dated Apr. 5, 2017, for CN patent application No. 2014800007448.4.
(Continued)

Primary Examiner — Manish S Shah
Assistant Examiner — Nigel Plumb
(74) Attorney, Agent, or Firm — Beusse Wolter Sanks & Maire

(57) ABSTRACT

A gas turbine system has a gas turbine engine, control unit, a data acquisition system including a thermodynamic model unit and a test sequence unit, sensor device coupled to the engine for measuring performance parameter of the engine, and comparative unit. The thermodynamic model unit generates computed performance parameter based on mechanical and thermodynamic models of the engine. The test sequence unit generates test sequence data including set point operating data and time schedule data with which a test cycle of the engine is runnable. The data acquisition system generates test control data based on the test sequence data, (Continued)

and is coupled to the control unit for providing test control data thereto to control the engine. The comparative unit is coupled to the data acquisition system such that the measured performance parameter measured by the sensor device is comparable with the computed performance parameter.

12 Claims, 1 Drawing Sheet

(51) Int. Cl.
*F02C 3/04* (2006.01)
*F02C 9/26* (2006.01)

(56) References Cited

U.S. PATENT DOCUMENTS

| | | | | |
|---|---|---|---|---|
| 4,821,217 | A * | 4/1989 | Jackson | G01M 15/05 701/3 |
| 5,521,824 | A * | 5/1996 | Eagan | G01M 15/044 700/282 |
| 8,161,806 | B1 * | 4/2012 | Weickert | F01D 17/085 73/112.01 |
| 2003/0045992 | A1 | 3/2003 | Humerickhouse et al. | |
| 2003/0046939 | A1 | 3/2003 | Hyakutake et al. | |
| 2009/0171626 | A1 | 7/2009 | Dweik et al. | |
| 2010/0089067 | A1 * | 4/2010 | Wilkes | G05B 23/0254 60/773 |
| 2010/0275575 | A1 * | 11/2010 | Brown | F02C 9/00 60/204 |
| 2010/0280732 | A1 | 11/2010 | Singh et al. | |
| 2012/0130688 | A1 | 5/2012 | Shaomo et al. | |

FOREIGN PATENT DOCUMENTS

| | | |
|---|---|---|
| EP | 1288644 B1 | 3/2007 |
| EP | 2175336 A1 | 4/2010 |
| EP | 2249004 A2 | 11/2010 |
| JP | H0586807 A | 4/1993 |
| JP | 2003106525 A | 4/2003 |
| JP | 2010019725 A | 1/2010 |
| JP | 2010261434 A | 11/2010 |
| JP | 2011508345 A | 3/2011 |
| JP | 2012113708 A | 6/2012 |
| RU | 2340883 C1 | 12/2008 |
| RU | 2389998 C1 | 5/2010 |
| WO | 2014122013 A1 | 8/2014 |

OTHER PUBLICATIONS

JP Office Action, dated Jun. 6, 2016, for JP application No. 2015-556438.
RU Office Action dated Nov. 8, 2016, for RU patent application No. 2015132521.
JP Decision of Refusal dated Nov. 21, 2016, for JP patent application No. 2015-556438.
RU Office Action dated Feb. 28, 2017, for RU patent application No. 2015132521.
Gardiner, D. et al, "Fabrication and Testing of an Enhanced Ignition System to Reduce Cold-Start Emissions in an Ethanol (E85) Light-Duty Truck Engine", National Renewable Energy Laboratory/SR-540-22967, pp. 1-108, Sep. 1997, Golden, CO.
Soviet Union Standard GOST 23851-79, "Aircraft gas turbine engines Terms and definitions", pp. 1-3, USSR, 1980 (Machine English translation attached).
Fisher, Ross, "Air-Fuel Ratio Control for Rich & Lean Burn", Energy-Tech, pp. 1-3, Dubuque, IA, Apr. 2004.
Robert Bosch GMBH, "Gasoline-engine management Emission Control, Technical Instruction"; Stuttgart, Germany, pp. 1-38, 1999.
KR Notice to File a Response dated Sep. 26, 2016, for KR application No. 10-2015-7023937.
JP Office Action dated Jan. 9, 2018, or JP patent application No. 2015556438.

* cited by examiner

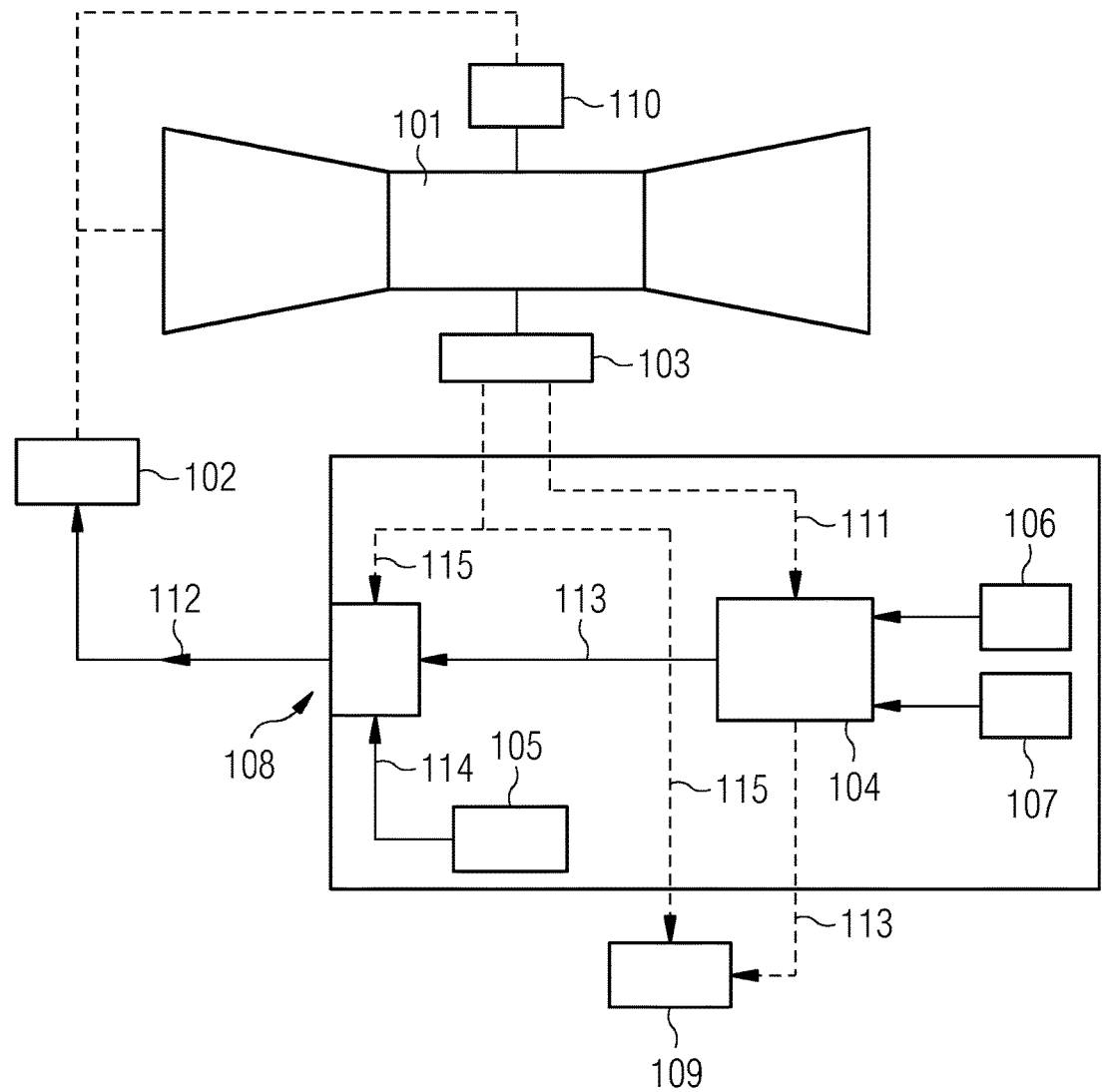

AUTO TESTING SYSTEM FOR A GAS TURBINE

CROSS REFERENCE TO RELATED APPLICATIONS

This application is the US National Stage of International Application No. PCT/EP2014/051168 filed Jan. 22, 2014, and claims the benefit thereof. The International Application claims the benefit of European Application No. EP13154041 filed Feb. 5, 2013. All of the applications are incorporated by reference herein in their entirety.

FIELD OF INVENTION

The present invention relates to a gas turbine comprising a test system and a method of operating a gas turbine system with a test procedure.

ART BACKGROUND

Industrial gas turbine engines are designed for producing mechanical or electrical power. After a certain operating time, e.g. after a repair or overhaul, test sequences under which the gas turbine engines run with predefined operating points have to be conducted in order to check if the industrial gas turbine engine runs still correctly. Each operating point specifies a set of set points representing the state the engine should be run at.

In conventional industrial gas turbine engines, a test sequence of a gas turbine engine is initiated manually. The operator controls the industrial gas turbine engine by a control device manually, such that the gas turbine engine runs with predetermined set points which are predefined by a test cycle. The predefined test cycle is for example generated in verification or performance tests of the industrial gas turbine engine.

Hence, in order to conduct a test sequence of the industrial gas turbine engine, operators are necessary which initiate and control the test cycles manually. Furthermore, the test sequence which is predetermined under verification tests does often not coincide with the measured operating parameters values and environmental parameters to which the gas turbine engine is exposed in reality. Some of the reasons for this deviation can be found in differences in climate (e.g. temperature or elevation) and fuel composition between where the industrial gas turbine is tested and where it is used on a daily basis.

U.S. Pat. No. 4,821,217 discloses a programmable test station which performs automatically static tests of electrical and pneumatic systems of jet aircraft engines. The test station automatically stimulates the systems to be tested on each engine and measures their response. A programmable data acquisition computer controls both, stimuli and measurements and generates data. The station is operatively connected to a plurality of engines simultaneously and tests certain systems on each in accordance with station user commands.

U.S. Pat. No. 4,389,710 discloses a test circuitry for exercising and testing the operability of antiskid and automatic braking control circuits in an aircraft braking system. A digital processor communicates with an interface circuit associated with each antiskid control circuit and the automatic braking system valve drivers. Each such interface circuit includes an analog switch receiving an electrical stimulus from the processor and applying the same to various test points in the associated antiskid control circuit or automatic braking system valve drivers. An analog selector is connected to various test points in the antiskid control circuits and automatic braking system valve drivers to sense the responses to the electrical stimulus and to pass such responses to the processor to determine the operability of the antiskid and automatic braking control systems.

U.S. Pat. No. 5,521,824 discloses an engine test apparatus using lead-lag control. An operating interface produces a control mode signal and a plurality of set points. The operators also include a test controller for receiving the control mode signal and the plurality of set points and responsively operating the engine test apparatus. The test controller senses operating characteristics of the engine test apparatus. The test controller also selectively operates engine test apparatus parameters in accordance with the control mode signal.

U.S. Pat. No. 8,161,806 discloses a method for monitoring engine performance parameters of a gas turbine engine of an aircraft during its operation. The method includes sensing the performance parameters and generating analog sensor outputs and producing digital data by conditioning the analog sensor outputs with at least one hub unit that is mounted close to an engine.

U.S. Pat. No. 4,215,412 discloses a real-time performance monitoring of gas turbine engines of an aircraft. The monitoring system includes a digital processor that utilizes a set of scalar coefficients and the current value of various engine operating parameters to predict the current value of a set of engine performance parameters. The actual values of these performance parameters are monitored and compared with the predicted values to supply deviation of aero signals to monitoring logic which provides an indication of faults with the digital processor.

EP 1 288 644 discloses a diagnostic method and a diagnostic system for turbine engines. The system evaluates whether faults detected during the testing of a gas turbine engine are related to the performance problems of the engine or to some other abnormality unrelated to engine performance. One performance parameter of the engine is evaluated under one performance condition to generate a first set of current engine data that is then compared to a first set of prior engine data to determine if there is an abnormality.

EP 2 175 336 A1 describes a method for monitoring of the performance of a gas turbine engine over a period of time and compensating for degradation experienced during that extended operation in order to maintain the most satisfactory performance.

EP 2 249 004 A2 describes a method and systems for automatically controlling the thrust output of a gas turbine engine to compensate for deterioration that may occur over time.

EP 2 175 336 A1 and EP 2 249 004 A2 each disclose predictive models which, based on the engine inlet conditions and a reference parameter such as the fuel input, calculate the performance that would be achieved by a nominal or reference engine. Measurements from the operating engine are then compared to equivalent predicted parameters from the model and used as a basis for adjusting one or more control parameters such as fuel system gains or pressure ratio limits etc.

SUMMARY OF THE INVENTION

It may be an objective of the present invention to provide an automatic testing of an industrial gas turbine engine under real-time conditions.

The present invention is a method testing a gas turbine engine, typically before delivery to a customer, and may be carried out automatically by means of closed loop control to achieve target performance parameters, such as power output, fuel consumption or emissions. The present method is an analytical model which, given measurements from the engine in operation, calculates thermodynamic parameters which cannot be measured directly, such as combustor outlet temperature or normalised speed (N/root (inlet temp)). These parameters are then fed back to the controller or control device where they are used in a closed loop to set an engine test operating point to give the value of those parameters corresponding to the value specified in a predefined test sequence.

This objective may be solved by a gas turbine system and by a method for operating a gas turbine system according to the independent claims.

According to a first aspect of the present invention, a gas turbine system is presented. The gas turbine system comprises a gas turbine engine for generating power, a control unit for controlling the gas turbine engine, a sensor device, a comparative unit and a data acquisition system comprising a thermodynamic model unit and a test sequence unit.

The sensor device is coupled to the gas turbine engine for measuring a performance parameter of the gas turbine engine.

The thermodynamic model unit generates computed performance parameter on the basis of a mechanical model of the gas turbine engine and of a thermodynamic model of the gas turbine engine.

A test sequence itself may be designed by a qualified person or the test sequence unit and input into the control unit by a qualified person. The test sequence data comprising set point operating data and time schedule data with which a test cycle of the gas turbine engine is runnable.

The data acquisition system generates test control data on the basis of the test sequence data. The data acquisition system is coupled to the control unit for providing the test control data to the control unit such that the gas turbine engine is controllable on the basis of the test control data.

The comparative unit is coupled to the data acquisition system such that the measured performance parameter measured by the sensor device during or after the test cycle is terminated is comparable with the computed performance parameter.

The gas turbine engine comprises for example a compressor section, a combustion section and a turbine section. By operating the gas turbine engine, (mechanical) power is generated which may be used for operating a generator for generating electrical power, for example.

In order to control the gas turbine engine, the control unit is installed. The control unit may control for example the fuel valves for controlling the fuel injection into the combustion section of the gas turbine engine.

Furthermore, a brake unit for braking a shaft of the gas turbine engine may be coupled to the gas turbine engine e.g. in order to absorb the power from the gas turbine. The control unit may control the brake unit for controlling the rotational speed of the shaft of the gas turbine engine and hence directly or indirectly the fluid mass flows through the gas turbine engine, for example. The control unit may control the brake load in addition to rotational speed of the shaft in order to set the operating point of the gas turbine engine.

The data acquisition system is used for gathering all necessary data of specific parameters in order to operate the gas turbine engine correctly and in order to control and test the gas turbine engine. The data acquisition system comprises the thermodynamic model unit and the test sequence unit, for example.

The sensor device is coupled to the gas turbine engine for measuring an operating parameter or for measuring the performance parameter. The sensor device comprises e.g. a temperature sensor, a pressure sensor, an oxygen sensor, a speed sensor or any other suitable sensors for measuring the desired parameter The operating parameter defines a parameter which is input to the gas turbine engine for operating the gas turbine engine.

The operating parameter is for example a fuel amount, a mass flow of an air flow volume or amount of bleed air bled of from the gas turbine engine.

The measured performance parameter defines the parameter which is outputted by the gas turbine engine while the gas turbine engine runs under the operating parameter. The measured performance parameter is for example a temperature of the gas turbine engine (e.g. in a predefined location of the gas turbine engine, such as the combustion section or the turbine section), the pressure at a certain location of the gas turbine engine, the emissions of the gas turbine engine, the fuel consumption and/or the load of the gas turbine engine, respectively.

The thermodynamic model unit comprises for example a storage wherein data of the mechanical model (simulation) of the gas turbine engines and of the thermodynamic model (simulation) of the gas turbine engine is stored.

The mechanical model of the gas turbine engine is for example a model which comprises the same dimensions and geometrical constraints of the gas turbine engines such that a simulation of the mechanical model is possible.

Accordingly, the thermodynamic model comprises data of specific operating conditions of the specific gas turbine engine. For example, the thermodynamic model calculates on the basis of certain input (i.e. operating) parameters specific output (performance) parameters such that the operation of the gas turbine engine is simulated. For example, as an input value, the amount of fuel, the amount of injected air and the amount of bleed air is predefined, so that the thermodynamic model may calculate (e.g. under consideration of the mechanical model) the theoretical simulated performance parameter, such as the temperature, the pressure or the emission of the gas turbine engines at e.g. the exit of the turbine stage.

On the basis of the mechanical model and the thermodynamic model, the thermodynamic model unit generates the computed performance parameter.

The computed performance parameter defines a simulated operating condition of a simulated operation of the gas turbine engine. The computed performance parameter is a computed and calculated parameter which is computed by the thermodynamic model unit on the basis of the measured or predefined operating parameter. In particular, the computed performance parameter is indicative of a computed (simulated) load, a computed (simulated) efficiency, a computed emission, a computed flow characteristic of the fluid through the gas turbine engine, a computed fuel consumption, a computed Lambda value and/or a computed power curve.

Hence, the computed performance parameter, such as the computed load, gives a simulated and theoretical indication under which input operating parameters (such as fuel mass flow, etc.) which output computed performance parameters should be achieved by the gas turbine engine theoretically, i.e. under nominal conditions and/or under simulation conditions.

The test sequence unit generates test sequence data comprising set point operating data and time schedule data with which the test cycle of the gas turbine engine is runnable. In other words, in the test sequence unit, predefined test proceedings and test cycles are stored, which should be accomplished after certain operation times of the gas turbine engines in order to assure the correct and failure-free run of the gas turbine engine.

The test sequence data comprises the set point operating data which denotes for example a set point acceleration data of the gas turbine engine, a set point speed of the gas turbine engine and a predefined fuel type used by the gas turbine engine. In other words, the set point operating data are control data which define the set point which should be achieved by the gas turbine engine when running the test cycle.

The time schedule data describe the time frames in which the gas turbine engine should be run with the predefined set point operating data during the test cycle.

The data acquisition system gathers specifically the (measured or predefined) operating parameters, the computed performance parameters and the test sequence data and generates on the basis of these parameters the test control data.

The comparative unit is coupled to the data acquisition system such that the measured performance parameter measured by the sensor system after or during the test cycle is comparable with the computed performance parameters. If the measured performance parameter is similar to the computed performance parameter, a proper operation of the gas turbine engine may be assumed.

Hence, the comparative unit checks whether the measured performance parameters after conducting the test cycle complies with the computed performance parameters which are computed and calculated by the thermodynamic model. Hence, if a large difference occurs between the computed performance parameter and the measured performance parameter, the gas turbine engine probably does not work correctly.

Hence, by the present invention, test control data are generated which do not only comprise test sequence data which are predefined under laboratory and theoretical conditions, but which does also consider computed performance parameters from a thermodynamic model of the gas turbine engine. Hence, test control data may be adapted more exactly to the environmental conditions and the actual operating status of the gas turbine engine such that specifically adapted test cycles may be conducted by the gas turbine engine.

For example, if the gas turbine engine operates at maximal power generation, a respective maximal power test may be conducted automatically. For example, the sensor device measures the maximum power generation and gives this information to the data acquisition system. Next, the data acquisition system receives from the thermodynamic model unit the computed performance parameters which are indicative of a thermodynamic model of the gas turbine engine which runs under maximal power generation. Additionally, the test sequence unit gives a test sequence data which comprise the set point operating data and the time schedule data that are necessary for testing the gas turbine engine under a maximal power generation.

Hence, the test control data do not only comprise the predefined test sequence data, e.g. for a maximum power test, but comprise also the computed performance parameters of the gas turbine engine which should be achieved while running under maximum power, for example.

Additionally, according to a further exemplary embodiment, the thermodynamic model unit is coupled to the sensor device such that the thermodynamic model unit generates the computed performance parameters additionally on the basis of the measured operating parameter. Hence, the thermodynamic model unit may receive information about the fuel injection volume, wherein the thermodynamic model unit may generate computed performance parameters, e.g. a computed load, which is theoretically achievable by the gas turbine engine if the measured fuel injection volume is injected.

According to a further exemplary embodiment, the test sequence unit is coupled to the control unit such that the test cycle is measurable automatically.

As described above, if the control unit runs the gas turbine engine under a maximum power generation, the test sequence unit may automatically initiate a maximum power test of the gas turbine engine. It is not longer necessary that an operator may initiate a test cycle manually.

According to a further exemplary embodiment, the test sequence unit is coupled to the control unit such that the test cycle is initiated by an operator manually.

According to a further exemplary embodiment, a control device is coupled to the control unit wherein the control device is controllable by the control unit such that the gas turbine engine is adjustable according to the test control data. As described above, the control device may be for example a control brake for applying a controlled load to the gas turbine engine output shaft so that, e.g. together with the control of the gas turbine output shaft rotational speed, a predefined value of the gas turbine operating point may be set and controlled. Additionally or alternatively, the control device may comprise a fuel valve for controlling the fuel supply to the gas turbine engine. Hence, the amount of fuel may be adjusted exactly according to the test control data, for example.

In the following, a method for operating a gas turbine system according to a further aspect of the present invention is described. A gas turbine engine generates power, wherein the gas turbine engine is controlled by a control unit. A performance parameter of the gas turbine engine is measured by a sensor device of a data acquisition system. Next, a computed performance parameter is generated on the basis of a mechanical model of the gas turbine engine and of a thermodynamic model of the gas turbine engine by a thermodynamic model unit. A test sequence data is generated, wherein the test sequence data comprises a set point operating data and a time schedule data with which a test cycle of the gas turbine engine is runnable by the test sequence unit. Next, test control data is generated on the basis of the test sequence data by the data acquisition system. The test control data are provided to the control unit such that the gas turbine engine is controllable by the control unit on the basis of the test control data. The measured performance parameter measured by the sensor device is compared with the computed performance parameter by a comparative unit.

Summarizing, by the present invention, the test control data do not only comprise predefined test data but do also include outputs (computed performance and/or computed operating parameter) from the thermodynamic model of the gas turbine engine.

The thermodynamic model may be continuously executed during the operation of the gas turbine engine by the thermodynamic model unit under consideration of the measured operating conditions. The running of the thermodynamic model unit is independently from the control unit which controls the gas turbine engine.

The outputs (computed performance parameter) from the thermodynamic model unit are based on a mechanical model of the gas turbine engine, the thermodynamic model of the gas turbine engine and the measured or predefined operating parameters of the gas turbine engine.

The test control data which comprises the set of operating points, for example, is uploaded to the control unit. The set of operating points (set point operating data) comprise for example a desired load (power) of the gas turbine engine which should be achieved under a certain operating mode of the gas turbine engine. The desired load can be specified as one of a selection from either one of the outputs (computed performance parameter) of the thermodynamic model or for example of the sensor device. Also a ramp rate can be specified to allow control a crossover operation between two specified operating states of the gas turbine engine. The test control data may also comprise for example the information about the desired speed as set point operating data the gas turbine engine should achieve during the test cycle. The desired speed can be taken from the actual speed (measured operating parameter) measured by the sensor device or a corrected speed (computed performance parameter) which is a computed operating parameter outputted from the thermodynamic model.

Furthermore, the test control data may comprise information of which type of fuel the gas turbine engine should run under the test cycle, i.e. if the gas turbine engine should run with gaseous fuel or liquid fuel.

The test sequence data further comprise information about the time schedule which defines the time how long the gas turbine engine should be held at the specified operating point (set point operating data). Furthermore, the test control data define operating conditions of the gas turbine and define an increase, a reduction or an elimination of an operating state of a holding period.

Furthermore, the data acquisition system may function as a part of a distributed closed loop controller wherein periodically test control data are generated to conduct the test cycles. Hence, the data acquisition system and the control unit act as a closed-loop controller by working together. The method is a closed loop and operable until target performance parameters are achieved for the gas turbine. Thus desirable performance parameters are achieved prior to delivery to a customer.

The data acquisition system generates or collects test control data or parameters which are then fed back to the controller or control device/unit where they are used in a closed loop to set an engine test operating point to give the value of those parameters corresponding to the value specified in a pre-defined test sequence.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWING

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

The FIGURE shows a schematical view of the gas turbine system according to an exemplary embodiment of the present invention.

DETAILED DESCRIPTION

The illustration in the drawing is schematical. Similar or identical elements are provided with the same reference signs.

The FIGURE shows the gas turbine system comprising the gas turbine engine 101 for generating power. Furthermore, a control unit 102 is shown for controlling the gas turbine engine 101. Additionally, the data acquisition system 108 is shown which comprises a thermodynamic model unit 104 and a test sequence unit 105.

A sensor device 103 is coupled to the gas turbine engine 101 for measuring a measured operating parameter 111 of the gas turbine engine 101.

The thermodynamic model unit 104 generates computed performance parameters 113 on the basis of a mechanical model 106 of the gas turbine engine 101 and of a thermodynamic model 107 of the gas turbine engine 101. The test sequence unit 105 generates test sequence data 114 comprising set point operating data and time schedule data with which a test cycle of the gas turbine engine 101 is runnable.

The data acquisition system 108 generates test control data 112 on the basis of the measured operating parameter 111, the computed performance parameter 113 and the test sequence data 114. The data acquisition system 108 is coupled to the control unit 102 for providing the test control data 112 to the control unit 102 such that the gas turbine engine 101 is controllable on the basis of the test control data 112.

As shown in the FIGURE, the thermodynamic model unit 104 is coupled to the sensor device 103 such that the thermodynamic model unit 104 generates the computed performance parameter 113 additionally on the basis of the measured operating parameter 111.

Furthermore, a comparative unit 109 is coupled to the data acquisition system 108 such that a measured performance parameter 115 which is measured by the sensor device 103 after or during a test cycle is terminated is comparable with the computed performance parameter 113.

Furthermore, a control device 110, such as a fuel valve for controlling the fuel supply to the gas turbine engine 101 or a control brake for controllably braking the gas turbine engine 101 is coupled to the gas turbine engine 101. The control unit 102 controls the control device 110 such that the gas turbine engine operating point is adjustable according to the test control data 112 sent by the data acquisition system 108.

It should be noted that the term "comprising" does not exclude other elements or steps and "a" or "an" does not exclude a plurality. Also elements described in association with different embodiments may be combined. It should also

The invention claimed is:

1. A gas turbine system, comprising:
   a gas turbine engine for generating power,
   a control unit for controlling the gas turbine engine,
   a data acquisition system comprising a thermodynamic model unit and a test sequence unit,
   a sensor device which is coupled to the gas turbine engine for measuring a performance parameter of the gas turbine engine, and
   a comparative unit,
   wherein the thermodynamic model unit generates computed performance parameter on the basis of a mechanical model of the gas turbine engine, on the basis of a thermodynamic model of the gas turbine engine, and on the basis of a measured performance parameter,
   wherein the test sequence unit generates test sequence data comprising set point operating data and time schedule data with which a test cycle of the gas turbine engine is runnable,
   wherein the data acquisition system generates test control data on the basis of the test sequence data, on the basis of the measured performance parameter, and on the basis of the computed performance parameter,
   wherein the data acquisition system is coupled to the control unit for providing the test control data to the control unit and for testing operation of the gas turbine engine on the basis of the test control data, and
   wherein the comparative unit is coupled to the data acquisition system for comparing the measured performance parameter as measured by the sensor device with the computed performance parameter.

2. The gas turbine system according to claim 1,
   wherein the thermodynamic model unit is coupled to the sensor device such that the thermodynamic model unit generates the computed performance parameter additionally on the basis of the measured operating parameter.

3. The gas turbine system according to claim 1,
   wherein the computed performance parameter is indicative of at least one of a computed load, a computed efficiency, a computed emission, a computed flow characteristic of fluid through the gas turbine engine, a computed fuel consumption, a computed lambda value and a computed power curve.

4. The gas turbine system according to claim 1,
   wherein the measured performance parameter is indicative of at least one of a measured temperature, a measured pressure, a measured speed, measured emissions, a measured fuel consumption and a measured load.

5. The gas turbine system according to claim 1,
   wherein the set point operating data comprise at least one of a set point acceleration data of the gas turbine engine, a set point speed of the gas turbine engine and a fuel type used by the gas turbine engine.

6. The gas turbine system according to claim 1,
   wherein the test sequence unit is coupled to the control unit such that the test cycle is initiable automatically.

7. The gas turbine system according to claim 1,
   wherein the test sequence unit is coupled to the control unit such that the test cycle is initiable by an operator manually.

8. The gas turbine system according to claim 1, further comprising
   a control device which is coupled to the control unit,
   wherein the control device is controllable by the control unit such that the gas turbine engine is adjustable according to the test control data.

9. The gas turbine system according to claim 8,
   wherein the control device comprises a control brake for controllably braking the gas turbine engine and/or a fuel valve for controlling the fuel supply to the gas turbine engine.

10. The gas turbine system according to claim 1,
    wherein the data acquisition system generates test control data which are fed back to the control device to be used in a closed loop to set an engine test operating point to give the value of those parameters corresponding to the value specified in a pre-defined test sequence.

11. A method for operating a gas turbine system, comprising:
    generating power by a gas turbine engine,
    controlling the gas turbine engine by a control unit,
    measuring a performance parameter of the gas turbine engine by a sensor device of a data acquisition system,
    generating by a thermodynamic unit a computed performance parameter on the basis of a mechanical model of the gas turbine engine and of a thermodynamic model of the gas turbine engine,
    generating by a test sequence unit test sequence data comprising set point operating data and time schedule data with which a test cycle of the gas turbine engine is runnable,
    generating test control data on the basis of the test sequence data by the data acquisition system,
    providing the test control data to the control unit and controlling the gas turbine engine by the control unit on the basis of the test control data, and
    comparing the measured performance parameter measured by the sensor device with the computed performance parameter by a comparative unit.

12. The method for operating a gas turbine system according to claim 11,
    wherein the method is a closed loop and operable until target performance parameters are achieved for the gas turbine.

* * * * *